(12) United States Patent
Iwai et al.

(10) Patent No.: US 7,479,599 B2
(45) Date of Patent: Jan. 20, 2009

(54) CORD OUTLET STRUCTURE OF ELECTRIC INSTRUMENT CABINET

(75) Inventors: Takeo Iwai, Osaka (JP); Katsuhiko Makino, Osaka (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 365 days.

(21) Appl. No.: 11/494,787

(22) Filed: Jul. 26, 2006

(65) Prior Publication Data
US 2007/0034407 A1 Feb. 15, 2007

(30) Foreign Application Priority Data
Jul. 26, 2005 (JP) .................... 2005-005943 U

(51) Int. Cl.
*H05K 5/03* (2006.01)
(52) U.S. Cl. .................... 174/66; 174/67; 220/241; 220/242
(58) Field of Classification Search ............ 174/66, 174/67, 50, 53, 57, 58, 650, 668, 669, 17 CT; 220/3.2–3.9, 4.02, 241, 242; 439/535, 536; D13/156, 177
See application file for complete search history.

(56) References Cited

U.S. PATENT DOCUMENTS

| | | | | |
|---|---|---|---|---|
| 4,749,363 A * | 6/1988 | Luska et al. | ............... | D13/156 |
| 5,912,432 A * | 6/1999 | Thomas | ............... | 174/67 |
| 6,133,531 A * | 10/2000 | Hayduke et al. | ............... | 174/67 |
| 6,756,543 B1 * | 6/2004 | Kaloustian | ............... | 174/67 |
| 7,060,898 B1 * | 6/2006 | Gretz | ............... | 174/53 |
| 7,309,834 B1 * | 12/2007 | Byrd | ............... | 174/53 |

FOREIGN PATENT DOCUMENTS

| JP | 59-87178 | 6/1984 |
|---|---|---|
| JP | 3094353 | 3/2003 |

OTHER PUBLICATIONS

Partial mechanical English translation of Japanese Utility Model No. JP3094353, 2 pages.

* cited by examiner

*Primary Examiner*—Angel R Estrada
(74) *Attorney, Agent, or Firm*—Osha - Liang LLP

(57) ABSTRACT

A cord outlet structure of an electric instrument cabinet, includes: an opening window for a cord outlet; and a cover for the opening window, wherein: the cover being formed continuous with one of the sides of the edges of the opening window through a resin hinge; the opening window is formed such that it becomes smaller in width as it parts away from the resin hinge, thereby inclining the two side edges of the opening window; the cover is formed such that it becomes smaller in width as it parts away from the resin hinge, thereby inclining both side edges of the cover; and the cover and opening window are formed such that the edges of the opening window and the side edges of the cover fitted into the opening window extend parallel to each other in their mutual adjacent positions or in their mutual contact positions.

4 Claims, 4 Drawing Sheets

CORD OUTLET STRUCTURE OF ELECTRIC INSTRUMENT CABINET

BACKGROUND

1. Technical Field

The present invention relates to a cord outlet structure of an electric instrument cabinet and, more specifically, the invention relates to a cord outlet structure of an electric instrument cabinet which, when the electric instrument cabinet includes not only an opening window serving as a cord outlet used to draw out power cords bound in a bundle from the inside of the cabinet to the outside thereof in the assembling process of the electric instrument or the like but also a cover molded integrally with the cabinet for closing the opening window after the cords are drawn out, can avoid generation of a clearance through which a foreign body can enter between the cover and the edge portions of the opening window when the opening window is closed by the cover.

2. Related Art

Conventionally, in the lower wall of a cabinet of an electric instrument, there is formed a relatively large opening window serving as a cord outlet used to draw out electric cords bound in a bundle from the inside of the cabinet to the outside thereof, and integrally with the cabinet, there is molded a cover; and, after the electric cords in a bundle are drawn out from the opening window in the assembling process of the electric instrument, the opening window is closed by the cover (for example, see Japanese Utility Model Registration No 3094353 and JP-UM-A-59-87178).

Here, FIG. 5 is a schematic perspective view of a cord outlet structure of an electric instrument cabinet according to another prior art, and FIG. 6 is a back view of the cord outlet structure, showing a state thereof when molds are removed after the cord outlet structure is molded. In this example, between the back wall 12 and lower wall 13 of a cabinet 1 (which is composed of a resin molding) of an electric instrument, there is formed an opening window 14 serving as a cord outlet; and, a cover 2 is formed integrally with the cabinet 1 through a resin hinge (not shown) composed of a thin part formed on the lower wall 13 side of the cabinet 1. The opening window 14 and cover 2 both have a substantially square-shaped contour shape with a rectangular shape as its base shape. Therefore, the left and right side edges 14a and 14b of the opening window 14 as well as the left and right side edges 2a and 2b are formed parallel to each other. Also, in the back wall 12 of the cabinet 1, there is formed a cord mounting part 15 on one side of the opening window 14 in such a manner that the cord mounting part 15 is continuous with the opening window 14, whereby a bushing 110, which is provided on the power cord 100 side and is fitted with and held by the cord mounting part 15, can be held by the cover 2 closed to the opening window 14 in such a manner that the bushing 110 can be prevented against removal from the cord mounting part 15. Also, the cover 2 closed to the opening window 14 can be fastened and connected by a mounting screw 16 to a boss portion 17 formed in the edge upper portion of the opening window 14.

On the other hand, in this type of electric instrument cabinet, when the cover 2 is closed to the opening window 14 and the opening window 14 is shut up, it is desired that a foreign body such as a coin made of an electric conductor or a metal wire member is prevented from being inserted into between the left and right edges 14a, 14b of the opening window 14 and cover 2. And, the UL regulations also require that measures should be taken to prevent the insertion of a coin into between the left and right edges 14a, 14b of the opening window 14 and cover 2.

In order to cope with this requirement, it is expected effective to take the following measures: that is, when the cabinet 1 is molded of resin, by enhancing the dimension precision of the opening width of the opening window 14 and the width of the cover 2, there can be prevented generation of a clearance between the left and right edges 14a, 14b of the opening window 14 and cover 2. However, to mold the cabinet 1 with such dimension precision requires an extremely high level of molding technique. In other words, even if such a dimension as to be able to prevent generation of a clearance is set in a mold design, generation of molding errors in the opening width of the opening window 14 and in the width of the cover 2 cannot be avoided due to the characteristics of resin used as the molding material and the level of the molding technique. As a result of this, the width of the cover 2 is inevitably too long to close the cover 2 to the opening window 14 properly.

In view of this, conventionally, in order to prevent such inconvenience that the width of the cover 2 is too long to close the cover 2 properly, the cover 2 is molded using a mold formed of a thin plate member such that the width of the cover 2 is slightly shorter than the opening width of the opening window 14. And, as measures for preventing a coin from being inserted through a clearance S which is generated as a result of the above short-width molding of the cover 2, as shown in FIG. 6, in two or more portions of the left and right edges 14a, 14b of the opening window 14 at given intervals (shorter intervals than the diameter of the coin), there are provided rib-shaped inward-facing projections 18a, 18b. Such provision of the projections 18a, 18b not only can prevent the insertion of the coin through the clearance S but also can prevent the occurrence of a situation that, when the cover 2 is closed to the opening window 14, the cover 2 can touch the edges 14a, 14b of the opening window 14 and cannot be thereby closed.

SUMMARY

However, such measures as have been described with reference to FIG. 6, that is, the provision of the projections 18a, 18b on the left and right edges 14a, 14b of the opening window 14 is effective in preventing the coin from entering through the clearance S wider than the thickness of the coin, but it is not effective in preventing the metal wire member from being inserted through the clearance S from between the projections 18a, 18b respectively provided on the two or more portions of the left and right edges 14a, 14b. When the metal wire member is inserted through the clearance S, there is a fear that such metal wire member can give rise to the short circuit of the power supply circuit. In connection with this, Japanese Utility Model Registration No 3094353 and JP-UM-A-59-87178 respectively disclose only the fact that the cover is molded integrally with the cabinet, but do not disclose measures to prevent the coin or a thin foreign body such as a metal wire member from entering through the clearance formed between the opening window and cover.

The present invention is made under the above-mentioned circumstances. That is, it is an object of the invention to provide a cord outlet structure of an electric instrument cabinet in which, in molding, a relatively wide clearance is formed between the right and left edges of an opening window of a cabinet and a cover to thereby be able to mold the cover integrally with the cabinet using only two inner and outer molds, while eliminating the need for use of the above-mentioned extra mold composed of a thin plate member; and, at the same time, when the cover is closed to the opening window to thereby shut up the opening window, generation of a clearance can be easily prevented between the left and right edges of the opening window and cover.

Also, it is another object of the invention to provide a cord outlet structure of an electric instrument cabinet which not only can accurately regulate the closing position of the cover with respect to the opening window but also, even when a metal wire member is forced into between the left and right edges of the opening window and cover, can prevent the metal wire member from being inserted into the inside of the cabinet.

Further, it is still another object of the invention to provide a cord outlet structure of an electric instrument cabinet which not only, even when a cover is molded integrally with a cabinet in a state where the opening degree of the cover can be decreased when molds are removed, can secure a wide clearance between the right and left edges of the cabinet and cover to thereby facilitate the molding operation, but also allows the opening window to be opened wide without setting large the bent angle of a resin hinge to thereby makes it easy for bundled power cords to be drawn out from the inside of the cabinet to the outside thereof without applying an excessive load to the resin hinge.

In a cord outlet structure of an electric instrument cabinet according to the invention, an electric instrument cabinet formed of a resin molding includes an opening window for forming a cord outlet and a cover for opening and closing the opening window; and, the cover is formed continuous with one of the sides of the edges of the opening window through a resin hinge composed of a thin part. And, the opening window is formed such that it becomes narrower in width as it parts away from the resin hinge, whereby the two edges of the opening window are inclined inwardly; the cover is formed such that it becomes narrower in width as it parts away from the resin hinge, whereby the two side edges of the cover are inclined inwardly; and, the cover and opening window are structured such that, when the cover is closed to the opening window, the edges of the opening window and the side edges of the cover fitted into the opening window are parallel to each other in their mutual adjacent positions or in their mutual contact positions.

According to this structure, the two edges of the opening window and the two side edges of the cover are respectively inclined inwardly, and also, when the cover, which is moved in the closing direction with the resin hinge as a fulcrum, is closed to the opening window, the edges of the opening window and the side edges of the cover fitted into the opening window are parallel to each other in their mutual adjacent positions or in their mutual contact positions. Thanks to this, when the cover is opened with the resin hinge as a fulcrum, there is generated a clearance between the two edges of the opening window and cover, while the clearance becomes wider as the opening degree of the cover increases. Therefore, if there is employed a technique of molding the cover integrally with the cabinet while the cover is opened, it is possible to mold the cover integrally with the cabinet using only two molds, that is, an inner mold and an outer mold, which can eliminate the need for use of such an extra mold composed of a thin plate member as described at the opening of the description of the paragraph [0006] on the prior art. Also, because the two side edges of the opening window and the two side edges of the cover are inclined inwardly, even if the dimension precision of the width of the cover varies, when the cover is closed to the opening window, such variation can be easily absorbed. As a result of this, there is prevented the occurrence of a situation that, between the two edges of the opening window and cover, there is generated such a clearance into which a coin or a metal wire member can be easily inserted. That is, in a case where, when the cover is closed to the opening window, the edges of the opening window and the side edges of the cover are arranged parallel to each other in their mutual contact positions, there can be generated no clearance between the edges of the opening window and cover, which makes it impossible for the coin or metal wire member to be inserted; and, when they are arranged parallel in their mutual adjacent positions, even if there is generated a clearance between the edges of the opening window and cover, there is eliminated a possibility that the clearance becomes so wide as allows the insertion of a foreign body such as the coin or metal wire member.

According to the invention, preferably, the opening window may be formed between the back wall and lower wall of the electric instrument cabinet, the cover can be opened and closed back and forth with the resin hinge (which is formed in the edge on the lower wall side of the cabinet) as a fulcrum, and the cabinet may be molded in a shape that, when the cover is opened, the cover and cabinet are evenly continuous with each other with the resin hinge between them. According to this structure, since the resin hinge is formed in the edge of the lower wall side of the electric instrument cabinet not in the back wall thereof, the opening window can be opened wide even if the bending angle of the resin hinge is not set so large when compared with a case where the resin hinge is formed in the back wall. This is useful in facilitating an assembling operation in which the opening window is opened wide without applying an excessive load to the resin hinge and the bundled power cords are naturally drawn out from the inside of the cabinet to the outside thereof through the wide opened opening window. Also, since the cabinet is molded in a shape that, when the cover is opened, the cover and cabinet are evenly continuous with each other with the resin hinge between them, a cabinet including a cover and an opening window can be molded using only two molds, that is, inner and outer molds.

According to the invention, preferably, integrally with the two side edges of the opening window, there may be molded cover receiver pieces respectively formed to have a width smaller than a horizontal clearance formed between the side edge of the cover and the edge of the opening window when the cover is opened and the front and rear side portions of the cover holding the resin hinge between them are evenly continuous with each other. According to this structure, since the closed position of the cover closed to the opening window can be accurately regulated by the cover receiver pieces, it is possible to make it difficult for such a situation to occur that the outer surface of the cabinet and the outer surface of the cover in the periphery of the opening window are uneven and thus the external appearance of the cabinet is worsened. Also, because the cover receiver pieces are respectively formed to have a width smaller than a horizontal clearance formed between the side edge of the cover and the edge of the opening window when the cover is opened and the front and rear side portions of the cover holding the resin hinge between them are evenly continuous with each other, a cabinet including a cover, an opening window and cover receiver pieces can molded using only two inner and outer molds.

A cord outlet structure of an electric instrument cabinet according to the invention can be embodied more specifically by employing the following structure. That is, in a cord outlet structure of an electric instrument cabinet in which the electric instrument cabinet made of a resin molding includes an opening window for forming a cord outlet and a cover for opening and closing the opening window and the cover is continuous with one of the sides of the edges of the opening window through a resin hinge composed of a thin part, the invention can be embodied more specifically by employing the following structure: the opening window is formed by and between the back wall and lower wall of the electric instrument cabinet; the cover can be opened and closed back and forth around the resin hinge provided in the lower wall side edge of the cabinet; the cabinet is molded in such a shape that, when the cover is opened, the cover and cabinet are evenly continuous with each other with the resin hinge held between them, and the opening window is formed such that it becomes smaller in width as it parts away from the resin hinge, thereby inclining the two side edges of the opening window inwardly; the cover is formed such that it becomes smaller in width as it parts away from the resin hinge, thereby inclining both side edges of the cover inwardly; the cover and opening window are formed such that, when the cover is closed to the opening window, the edges of the opening window and the side edges of the cover become parallel to each other in their mutual adjacent positions or in their mutual contact positions; integrally with both side edges of the opening window, there are formed cover receiver pieces respectively having a width smaller than a horizontal clearance formed between the side edge of the cover and the edge of the opening window when the cover is opened and the front and rear side portions of the cover holding the resin hinge between them are evenly continuous with each other, the cover receiver pieces being used to regulate the closing position of the cover. The operation of the invention will be discussed in detail with reference to an embodiment thereof to be described later.

As described above, according to the invention, because of the improvements in the shape of the opening window to be formed in the cabinet and also in the shape of the cover, the cover can be molded integrally with the cabinet using only two, that is, inner and outer molds to thereby eliminate the need for use of an extra mold made of a thin plate member, and, by closing the cover to the opening window, molding errors on the dimensions of the opening width of the opening window and the width of the cover can be absorbed, thereby being able to prevent the formation of such a wide clearance between the right and left side edges of the opening window and cover as allowing the insertion of a coin or a metal wire member. Therefore, it is possible to prevent a situation that the coin or metal wire member can be inserted unexpectedly through a clearance to be formed between the two side edges of the opening window and cover, which can enhance the safety of the electric instrument. Also, even when cover receiver pieces are molded integrally with the edges of the opening window to thereby regulate the closing position of the cover accurately, a cabinet having the cover receiver pieces can be molded together with the cover using only two, that is, inner and outer molds. And, such provision of the cover receiver pieces not only can prevent formation of different levels or the like in the forming portion of the cord outlet, thereby making it easy to finish well the external appearance of the cord outlet forming portion, but also, even when the coin or metal wire member is forced into between the right and left edges of the opening window and cover, can prevent the coil or metal wire member from being inserted up to the inside of the cabinet.

BRIEF DESCRIPTION OF THE DRAWINGS

These and other objects and advantages of this invention will become more fully apparent from the following detailed description taken with the accompanying drawings in which.

DETAILED DESCRIPTION

Figure 1:
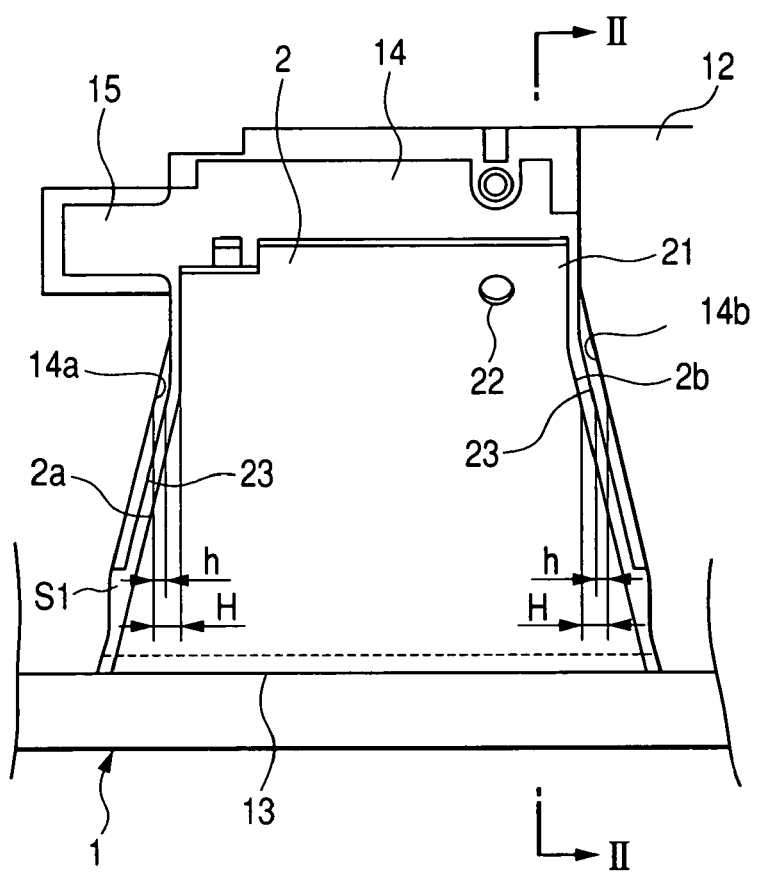
FIG. 1 is a back view of the main portions of a cord outlet structure according to an embodiment of the invention, showing a state thereof in which molds are released.
Figure 2:
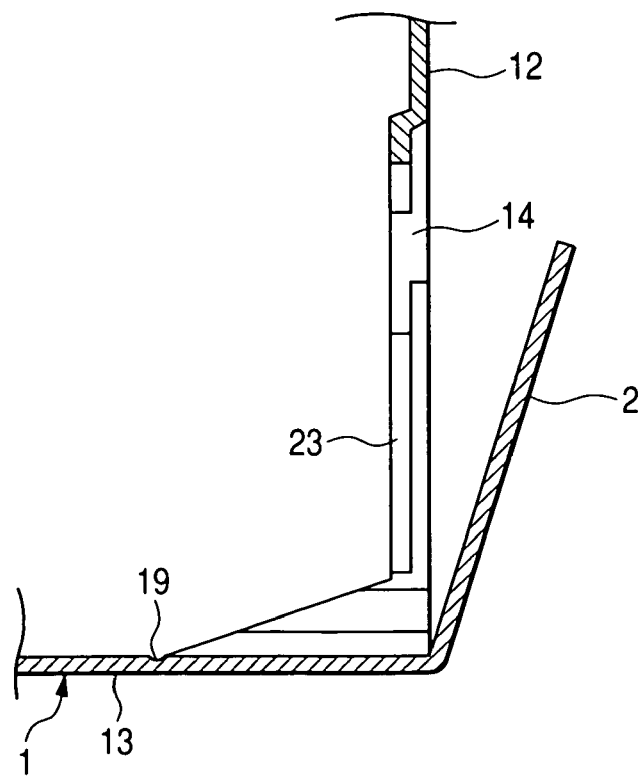
FIG. 2 is a section view taken along the line II-II shown in FIG. 1.
Figure 3:
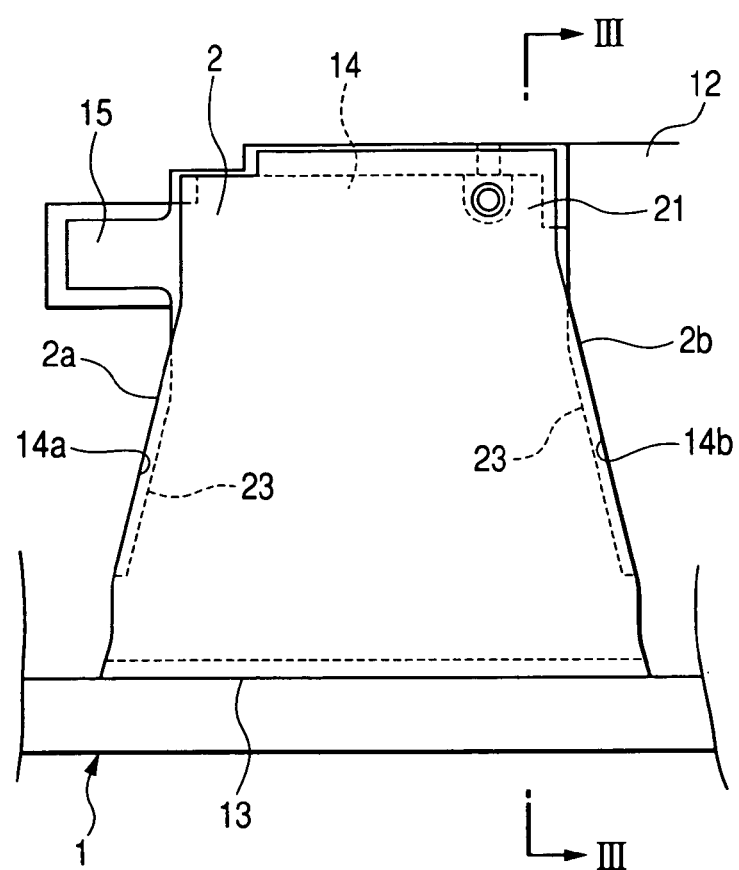
FIG. 3 is a back view of the main portions of the cord outlet structure, showing a state thereof in which a cover is closed.
Figure 4:
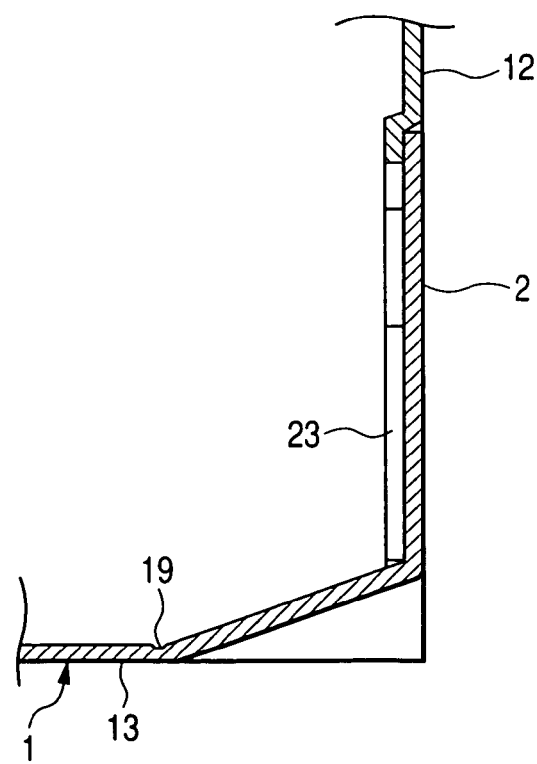
FIG. 4 is a section view taken along the line IV-IV shown in FIG. 3.

FIG. 1 is a back view of a cord outlet structure when a cabinet 1 is molded of resin and molds are then removed therefrom, FIG. 2 is a section view taken along the line II-II shown in FIG. 1, FIG. 3 is a back view of the cord outlet structure, showing a state thereof in which a cover is closed, and FIG. 4 is a section view taken along the line IV-IV shown in FIG. 3.

As a cord outlet, there is formed an opening window 14 which is opened up so as to extend over and between the back wall 12 and lower wall 13 of a cabinet 1; and, to the opening window 14, there can be closed a cover 2 which is molded of resin integrally with the cabinet 1.

As can be seen from FIG. 2 or FIG. 4, the cover 2 is continuously connected with the cabinet 1 on the lower wall 13 side of the cabinet 1 through a linear shaped resin hinge 19 composed of a thin part. Also, the whole of the cover 2 becomes smaller in width as it parts away from the resin hinge 19 except for its upper end portion 21 substantially formed in a rectangular shape long sideways, whereby both of the left and right side edges 2a, 2b thereof are inclined inwardly. In the substantially rectangular-shaped upper end portion 21 of the cover 2, there is opened up a mounting screw insertion hole 22.

On the other hand, in the case of the opening window 14 formed as a cord outlet in the cabinet 1, although the upper portion thereof is formed in a rectangular shape long sideways, the whole of the opening window 14 except for the upper portion thereof is formed such that it becomes smaller in width as it goes away from the resin hinge 19, whereby the both of the left and right edges 14a, 14b are inclined inwardly. Here, the inclination angles of the left and right side edges 2a, 2b of the cover 2 with respect to the horizontal line are set to be identical with the inclination angles of the left and right edges 14a, 14b of the opening window 14 with respect to the horizontal line. And, as shown in FIG. 1 or FIG. 2, when the cover 2 is moved in its closing direction from the opened state of the cover 2 with the resin hinge 19 as a fulcrum and, as shown in FIG. 3 or FIG. 4, is thereby fitted into and closed to the opening window 14, the rectangular shaped upper end portion 21 of the cover 2 is fitted into the substantially rectangular shaped upper portion of the opening window 14 and, at the same time, the left and right side edges 14a, 14b of the opening window 14 are parallel to the left and right side edges 2a, 2b of the cover 2 which have been fitted into the opening window 14, while they are opposed to each other in their mutual adjacent positions or are contacted with and superimposed on top of each other. Therefore, by closing the cover 2 to the opening window 14, the cover 2 is superimposed on the left and right side edges 14a, 14b of the opening window 14 to thereby prevent generation of a clearance between them, or, even when a clearance is generated, the size of the clearance can be restricted to an extremely small size.

Referring further to this, since the inclination angles of the left and right side edges 2a, 2b of the cover 2 are identical with the inclination angles of the left and right edges 14a, 14b of the opening window 14 and the resin hinge 19 is formed in the edge of the opening window 14 on the lower wall 13 side of the cabinet 1, when the cover 2 is moved in its closing direction about the resin hinge 19 from the opened state thereof shown in FIG. 1 or FIG. 2 to the closed position thereof shown in FIG. 3 or FIG. 4 where it is closed to the opening window 14, the cover 2 is closingly moved forward from its backward position and is thereby shifted upward from its downward position. Therefore, when the cover 2 is closed to the opening window 14, the cover 2 is pushed up upward within the opening window 14 and the left and right side edges 2a, 2b of the cover 2 are respectively superimposed on the left and right edges 14a, 14b of the opening window 14; and, as a result of this, as described above, the cover 2 is superimposed on the left and right side edges. 14a, 14b of the opening window 14 to thereby prevent a clearance from being generated between them. In this case, even when a clearance is generated, the size of the clearance can be restricted to an extremely small size. For this reason, even if variations due to molding errors are present in the opening width dimension of the opening window 14 and in the width dimension of the cover 2, there is eliminated a possibility that, between the cover 2 and the left and right side edges 14a, 14b of the opening window 14, there can be generated a clearance having such a wide size as allows the insertion of the coin or metal wire member.

Also, as described above, the present structure is arranged such that, when the cover 2 is closed to the opening window 14, as shown in FIG. 3, no clearance can be generated between the cover 2 and the left and right side edges 14a, 14b of the opening window 14; however, when the cover 2 is opened, since the cover 2 is situated at a position lower than its closed position with respect to the opening window 14, as shown in FIG. 1, between the cover 2 and the left and right side edges 14a, 14b of the opening window 14, a clearance S1 is generated in the horizontal direction and the clearance S1 becomes wider as the opening degree of the cover 2 increases. In view of this, when molding the cabinet 1, as shown in FIG. 2, if the cover 2 and the lower wall 13 of the cabinet 1 may be set evenly continuous with each other with the resin hinge 19 between them and the cover 2 may be kept opened to thereby set the clearance S1 wide in some measure, by using the horizontally extending relatively wide clearance S1 generated between the cover 2 and the left and right side edges 14a, 14b of the opening window 14, the two inner and outer molds for molding the cover 2 integrally with the cabinet 1 may be removed in the back-and-forth direction. Employment of this molding method can eliminate the need for use of an extra mold made of a thin plate member. Also, because there can be similarly secured a wide clearance between the upper side of the edge of the opening window 14 and the upper end edge of the cover 2, it is possible to employ the molding method with no difficulty that the cover 2 is molded integrally with the cabinet using a technique of removing the two inner and outer molds in the back-and-forth direction.

Figure 5:
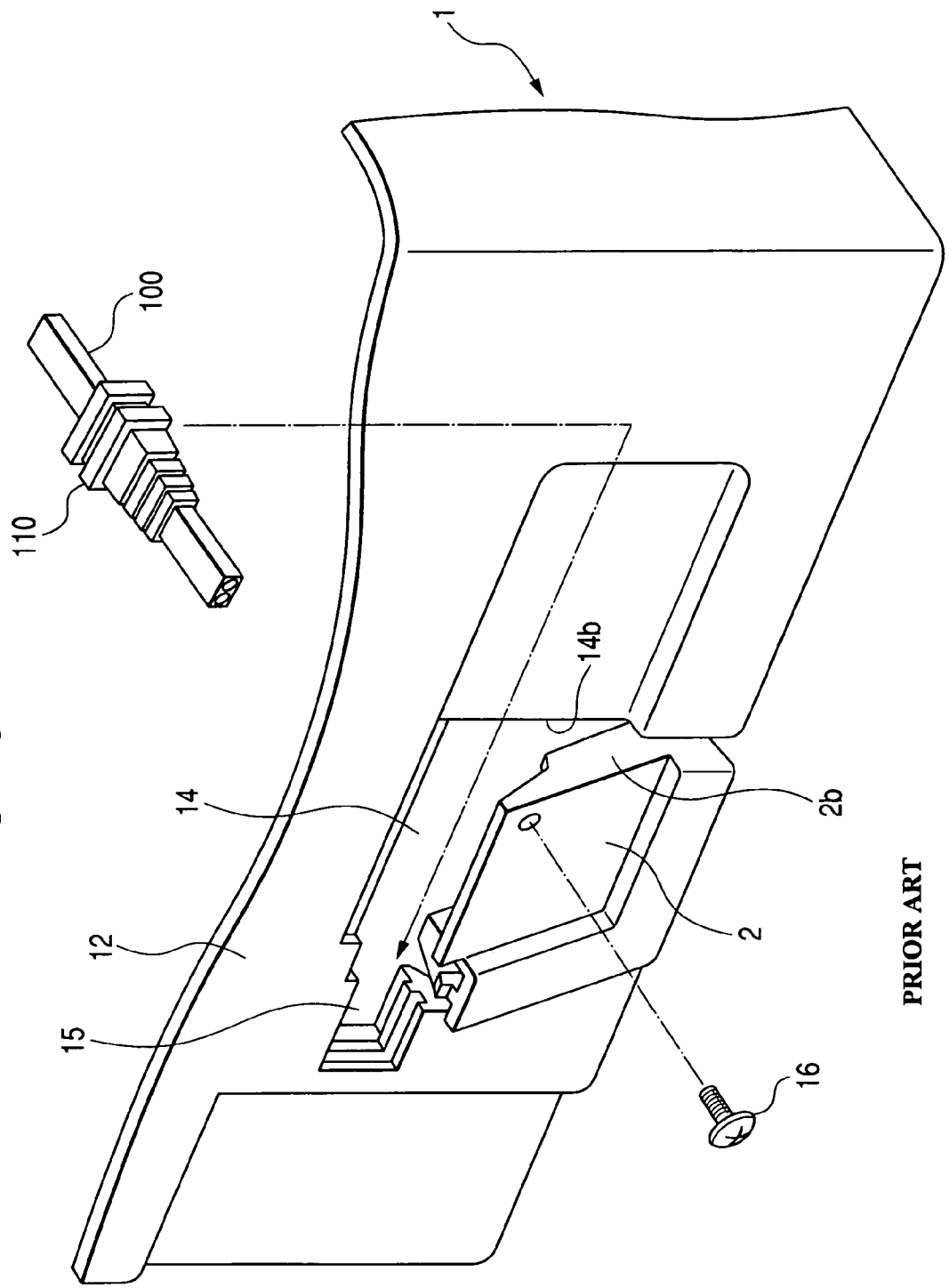
FIG. 5 is a schematic perspective view of a conventional cord outlet structure of an electric instrument cabinet.
Figure 6:
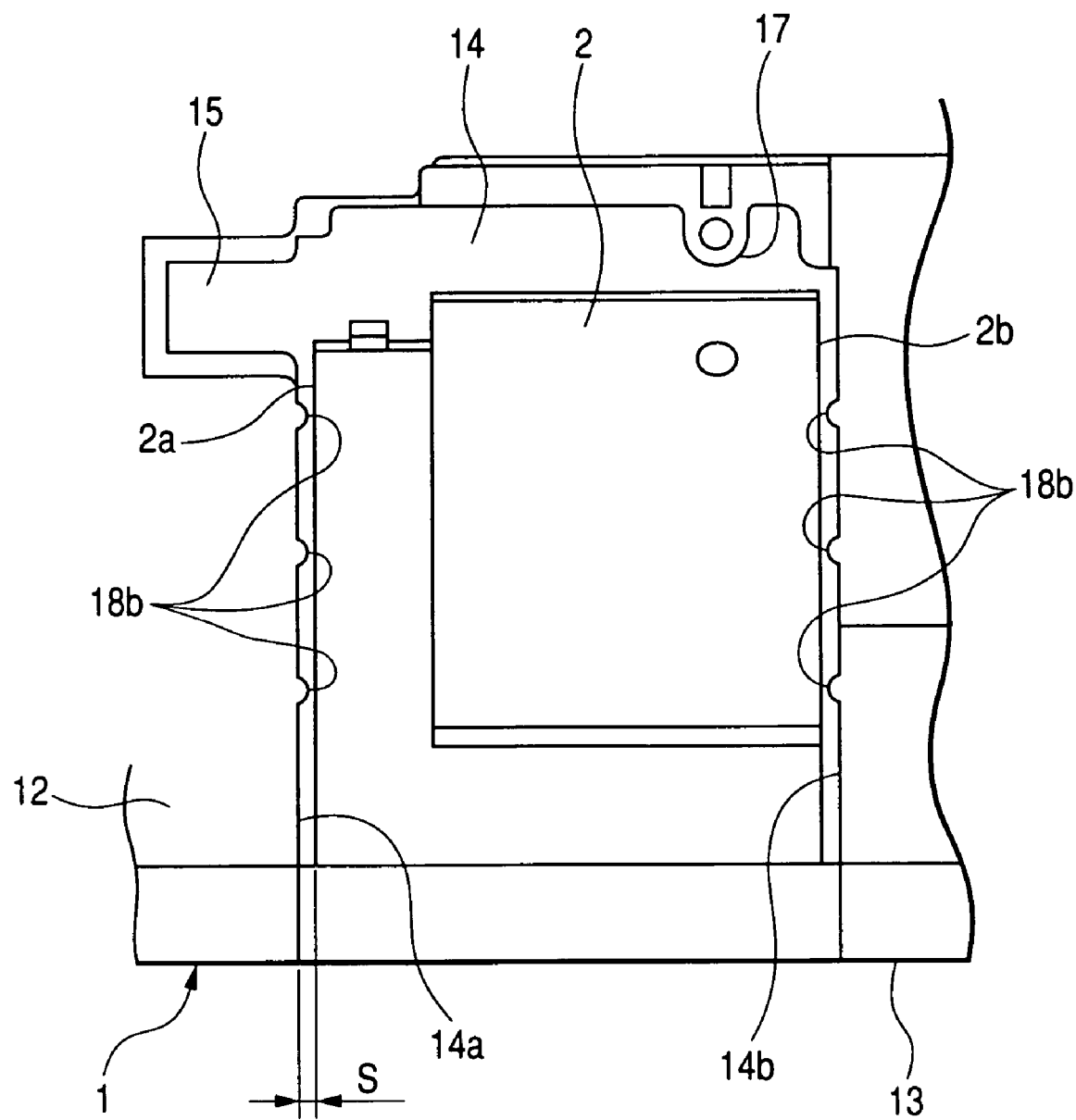
FIG. 6 is a back view of the conventional cord outlet structure, showing a state thereof in which molds are released.

In the cord outlet structure according to the present embodiment, in order to regulate the closing position of the cover 2 to the opening window 14 with high precision, there are molded cover receiver pieces 23 integrally with the left and right side edges 14a, 14b of the opening window 14. The cover receiver pieces 23 are respectively formed to have a width smaller than a horizontal clearance H between the cover 2 and the side edges 14a, 14b of the opening window 14 generated in a state where the opening degree of the cover 2 opened when the cover 2 is molded integrally with the cabinet 1 is kept, that is, in a state where the lower wall 13 of the cabinet 1 and cover 2 are kept evenly continuous with each other with the resin hinge 19 between them. In other words, a reference sign h designates the horizontal width of the cover receiver piece 23, while the horizontal width h is shorter than the horizontal clearance H. In this manner, when the cover receiver pieces 23 are provided on the left and right side edges 14a, 14b of the opening window 14, because the cover is received by the cover receiver pieces 23 when the cover 3 is closed to the opening window 14, the surface of the cabinet 1 and the surface of the cover 2 in the periphery of the opening window 14 can be set continuous and flush with each other, which can make it easy to keep their external appearances well. Also, since, as described above, the horizontal width h of the cover receiver piece 23 is set narrower in width than the horizontal clearance H between the side edges 14a, 14b of the opening window 14 and cover 2, the cover receiver pieces 23 can be easily molded integrally with the cabinet 1 together with the opening window 14 and cover 2 and, in this case, it is possible to employ a molding method with no difficulty in which the two inner and outer molds are removed in the back-and-forth direction. According to the present embodiment, similarly to the conventional structure described above with reference to FIG. 5, in the back wall 12 of the cabinet 1, there is formed a cord mounting part 15 which is disposed continuous with the opening window 14 on one side of the opening window 14, and the bushing 110 (see FIG. 5) on the power cord 100 side fitted into and held by the cord mounting part 15 can be held by the cover 2 closed to the opening window 14 in such a manner that the bushing 110 is prevented from being removed from the cord mounting part 15. Also, the cover 2 closed to the opening window 14 is fastened and connected to a boss part 17, which is formed in the upper portion of the edge of the opening window 14, using the mounting screw 16 (see FIG. 5).

What is claimed is:

1. A cord outlet structure of an electric instrument cabinet, comprising:
    an opening window for forming a cord outlet; and
    a cover for opening and closing the opening window, wherein:
    the electric instrument cabinet made of a resin molding including the opening window and the cover;
    the cover being formed continuous with one of the sides of the edges of the opening window through a resin hinge composed of a thin part;
    the opening window is formed by and between the back wall and lower wall of the electric instrument cabinet, while the cover can be opened and closed back and forth with the resin hinge as a fulcrum, the resin hinge being provided on the edge of the opening window on the lower wall side of the cabinet;
    the cabinet is molded in such a shape that, when the cover is opened, the cover and cabinet can be evenly continuous with each other with the resin hinge between them;
    the opening window is formed such that it becomes smaller in width as it parts away from the resin hinge, thereby inclining the two side edges of the opening window inwardly;
    the cover is formed such that it becomes smaller in width as it parts away from the resin hinge, thereby inclining both side edges of the cover inwardly;
    the cover and opening window are formed such that, when the cover is closed to the opening window, the edges of the opening window and the side edges of the cover fitted into the opening window extend parallel to each other in their mutual adjacent positions or in their mutual contact positions; and integrally with both side edges of the opening window, there are formed cover receiver pieces each having a width smaller than horizontal clearances respectively formed between the side edges of the cover and the edges of the opening window when the cover is opened and the front and rear side portions of the cover holding the resin hinge between them are evenly continuous with each other, the cover receiver pieces capable of regulating the closing position of the cover.

2. A cord outlet structure of an electric instrument cabinet, comprising:

an opening window for forming a cord outlet; and a cover for opening and closing the opening window, wherein:

the electric instrument cabinet being molded of resin and including the opening window and the cover;

the cover being formed continuous with one of the sides of the edges of the opening window through a resin hinge composed of a thin part;

the opening window is formed such that it becomes smaller in width as it parts away from the resin hinge, thereby inclining the two side edges of the opening window inwardly;

the cover is formed such that it becomes smaller in width as it parts away from the resin hinge, thereby inclining both side edges of the cover inwardly; and the cover and opening window are formed such that, when the cover is closed to the opening window, the edges of the opening window and the side edges of the cover fitted into the opening window extend parallel to each other in their mutual adjacent positions or in their mutual contact positions.

3. The cord outlet structure of an electric instrument cabinet according to claim 2, wherein:

the opening window is formed by and between the back wall and lower wall of the electric instrument cabinet, while the cover can be opened and closed back and forth with the resin hinge as a fulcrum, the resin hinge being provided on the edge of the opening window on the lower wall side of the cabinet; and the cabinet is molded in such a shape that, when the cover is opened, the cover and cabinet can be evenly continuous with each other with the resin hinge between them.

4. The cord outlet structure of an electric instrument cabinet according to claim 2, wherein integrally with both side edges of the opening window, there are molded cover receiver pieces each having a width smaller than horizontal clearances respectively formed between the side edges of the cover and the edges of the opening window when the cover is opened and the front and rear side portions of the cover holding the resin hinge between them are evenly continuous with each other, the cover receiver pieces capable of regulating the closing position of the cover.

* * * * *